(12) United States Patent
Yamakage et al.

(10) Patent No.: US 10,721,008 B2
(45) Date of Patent: Jul. 21, 2020

(54) TRANSMITTING SYSTEM, MULTIPLEXING APPARATUS, AND LEAP SECOND CORRECTION METHOD

(71) Applicants: KABUSHIKI KAISHA TOSHIBA, Minato-ku (JP); Toshiba Infrastructure Systems & Solutions Corporation, Kawasaki-shi (JP)

(72) Inventors: Tomoo Yamakage, Yokohama (JP); Tatsuya Tanaka, Kawasaki (JP); Yasumichi Hashi, Fuchu (JP); Keita Iwami, Fuchu (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 429 days.

(21) Appl. No.: 15/700,397

(22) Filed: Sep. 11, 2017

(65) Prior Publication Data

US 2017/0373779 A1    Dec. 28, 2017

Related U.S. Application Data

(60) Provisional application No. PCT/JP2015/083887, filed on Dec. 2, 2015.

(30) Foreign Application Priority Data

Mar. 11, 2015  (JP) ................. 2015-048417

(51) Int. Cl.
*H04J 3/06* (2006.01)
*H04N 21/242* (2011.01)
(Continued)

(52) U.S. Cl.
CPC .......... *H04J 3/0661* (2013.01); *H04J 3/0632* (2013.01); *H04J 3/0685* (2013.01);
(Continued)

(58) Field of Classification Search
CPC ...... H04W 24/60; H04W 4/80; G08G 5/0004; B64C 39/024
See application file for complete search history.

(56) References Cited

U.S. PATENT DOCUMENTS

2002/0116361 A1    8/2002  Sullivan
2005/0111826 A1    5/2005  Sullivan
(Continued)

FOREIGN PATENT DOCUMENTS

JP    2000-75071    3/2000
JP    2004-507176   3/2004

OTHER PUBLICATIONS

International Search Report dated Feb. 23, 2016 in PCT/JP2015/083887, filed on Dec. 2, 2015 (with English Translation).
(Continued)

*Primary Examiner* — Charles C Jiang
*Assistant Examiner* — Voster Preval
(74) *Attorney, Agent, or Firm* — Oblon, McClelland, Maier & Neustadt, L.L.P.

(57) ABSTRACT

A transmitting system includes an outputting apparatus and a multiplexing apparatus. The outputting apparatus transmits MMTP packets to which an NTP short format timestamp is added. The multiplexing apparatus multiplexes the MMTP packets. The multiplexing apparatus includes an extractor, a controller, a determiner, a management information generator, a continuity determiner, and a transmission timing adjuster. The transmission timing adjuster writes, for adjustment of a transmission timing of an MMTP packet being close to an MMTP packet in which an NTP short format timestamp value is discontinuous, time information taking a leap second processing into consideration, to the NTP short format timestamp of the MMTP packet.

15 Claims, 10 Drawing Sheets

(51) Int. Cl.
  *H04N 21/643* (2011.01)
  *H04N 21/434* (2011.01)
  *H04L 29/06* (2006.01)

(52) U.S. Cl.
  CPC ............ *H04L 65/608* (2013.01); *H04L 69/28* (2013.01); *H04N 21/242* (2013.01); *H04N 21/4343* (2013.01); *H04N 21/64322* (2013.01); *H04J 3/0667* (2013.01)

(56) References Cited

U.S. PATENT DOCUMENTS

| 2005/0111827 | A1 | 5/2005 | Sullivan |
| 2005/0111828 | A1 | 5/2005 | Sullivan |
| 2005/0111839 | A1 | 5/2005 | Sullivan |
| 2005/0117879 | A1 | 6/2005 | Sullivan |
| 2006/0078291 | A1 | 4/2006 | Sullivan |
| 2017/0257647 | A1* | 9/2017 | Iguchi ................. H04N 21/234 |
| 2017/0359611 | A1* | 12/2017 | Iguchi ................ H04N 21/2381 |
| 2018/0014060 | A1* | 1/2018 | Shimofure ....... H04N 21/64322 |
| 2018/0034571 | A1* | 2/2018 | Kitazato ............... H04J 3/0664 |
| 2018/0227626 | A1* | 8/2018 | Nakazawa ............. H04H 20/30 |

OTHER PUBLICATIONS

Written Opinion dated Feb. 23, 2016 in PCT/JP2015/083887, filed on Dec. 2, 2015.
"STEP mode and SLEW mode of the leap second", labunix's blog, http://labunix.hateblo.jp/entry/2012/03/04/194140, 2012, 4 pages (with English Translation).
"Information technology—High efficiency coding and media delivery in heterogeneous environments—Part 1:MPEG media transport (MMT)", ISO/IEC JTC 1/SC29, 2013, 98 pages.

* cited by examiner

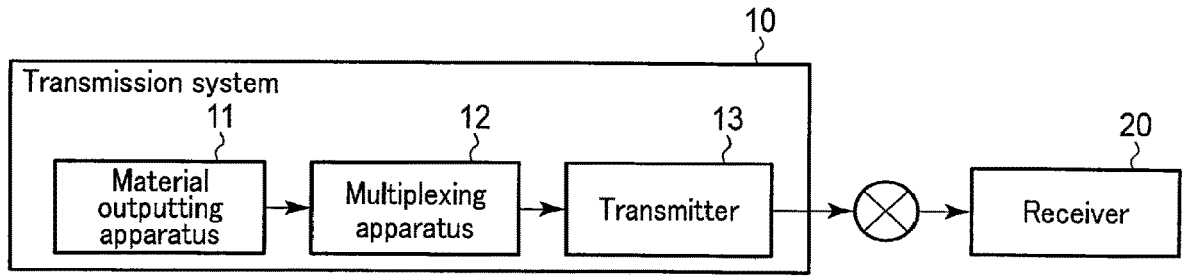

FIG. 1

| Data description | Number of bits | Data structure |
|---|---|---|
| MMTP_packet () { | | |
|     Version | 2 | uimsbf |
|     packet_counter_flag | 1 | bslbf |
|     FEC_type | 2 | uimsbf |
|     Reserved | 1 | bslbf |
|     extension_flag | 1 | bslbf |
|     RAP_flag | 1 | bslbf |
|     Reserved | 2 | bslbf |
|     payload_type | 6 | uimsbf |
|     packet_id | 16 | uimsbf |
|     Timestamp ← Transmission time information of NTP short format | 32 | uimsbf |
|     packet_sequence_number | 32 | uimsbf |
|     if (packet_counter_flag == 1) { | | |
|         packet_counter | 32 | uimsbf |
|     } | | |
|     if (extension_flag == 1) { | | |
|         extension_type | 16 | uimsbf |
|         extension_length | 16 | uimsbf |
|         for (i=0 , i<N; i++) { | | |
|             header_extension_byte | 8 | bslbf |
|         } | | |
|     } | | |
|     MMTP_payload () | | |
| } | | |

FIG. 2

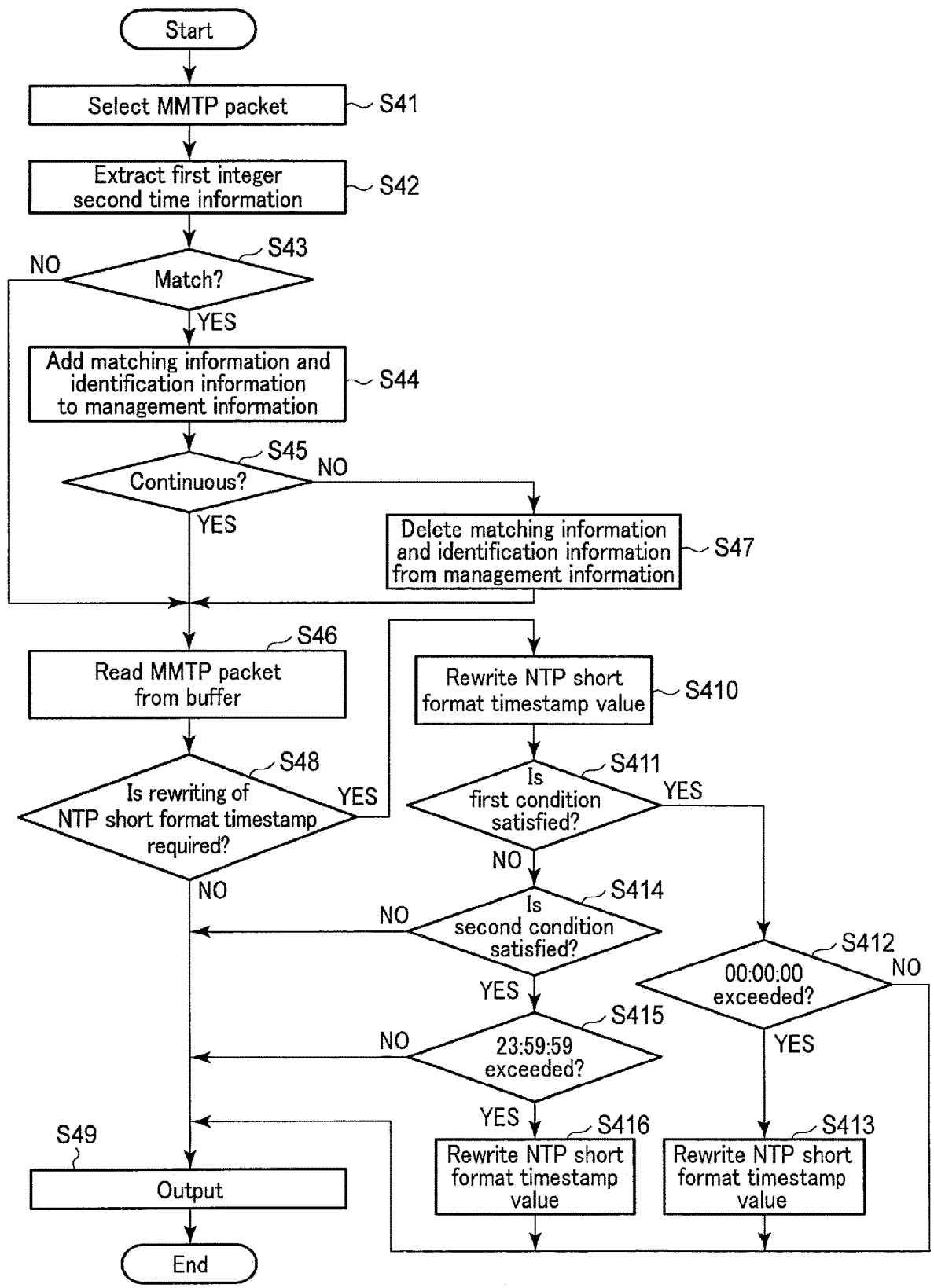
F I G. 4

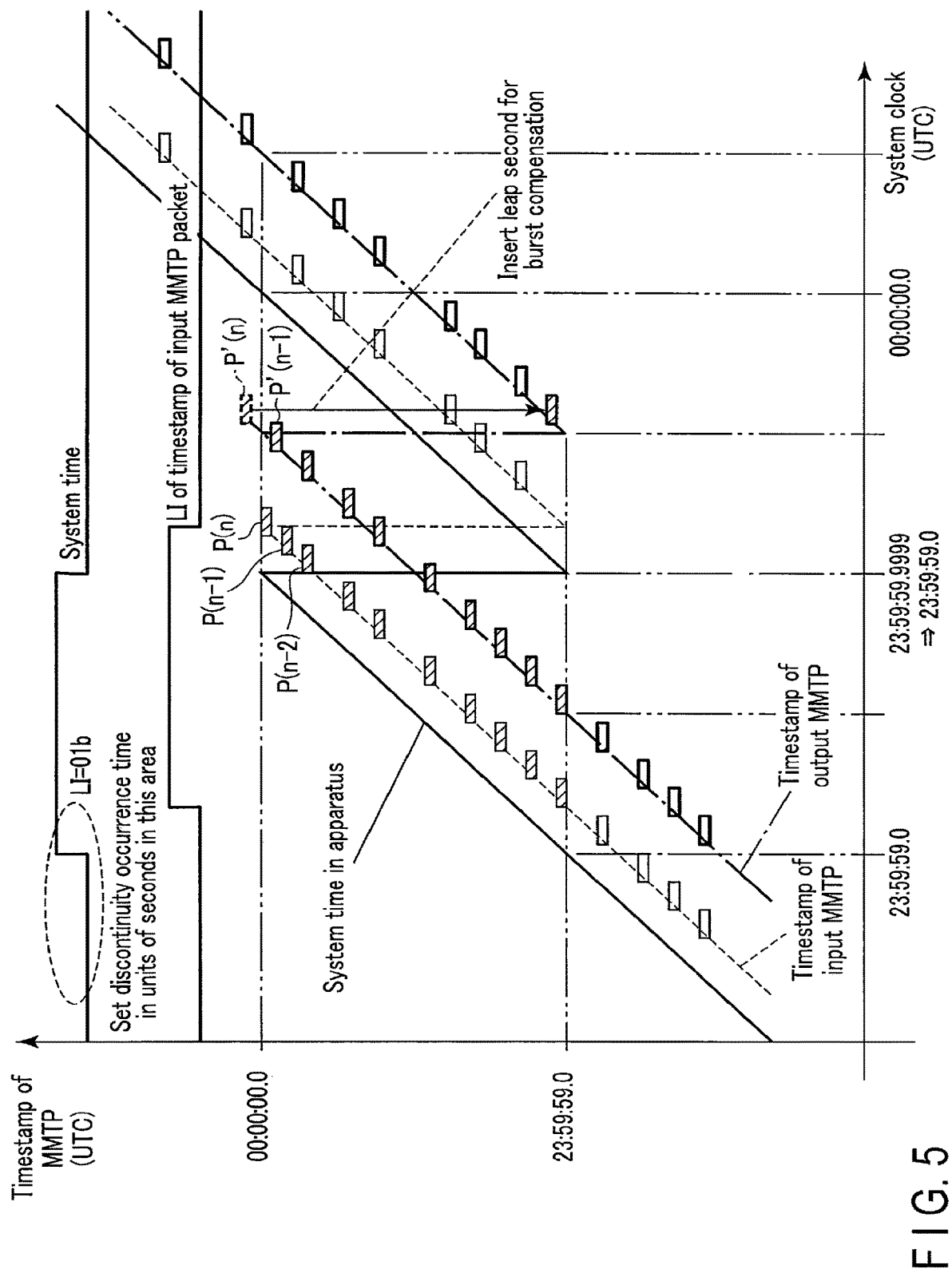
F I G. 5

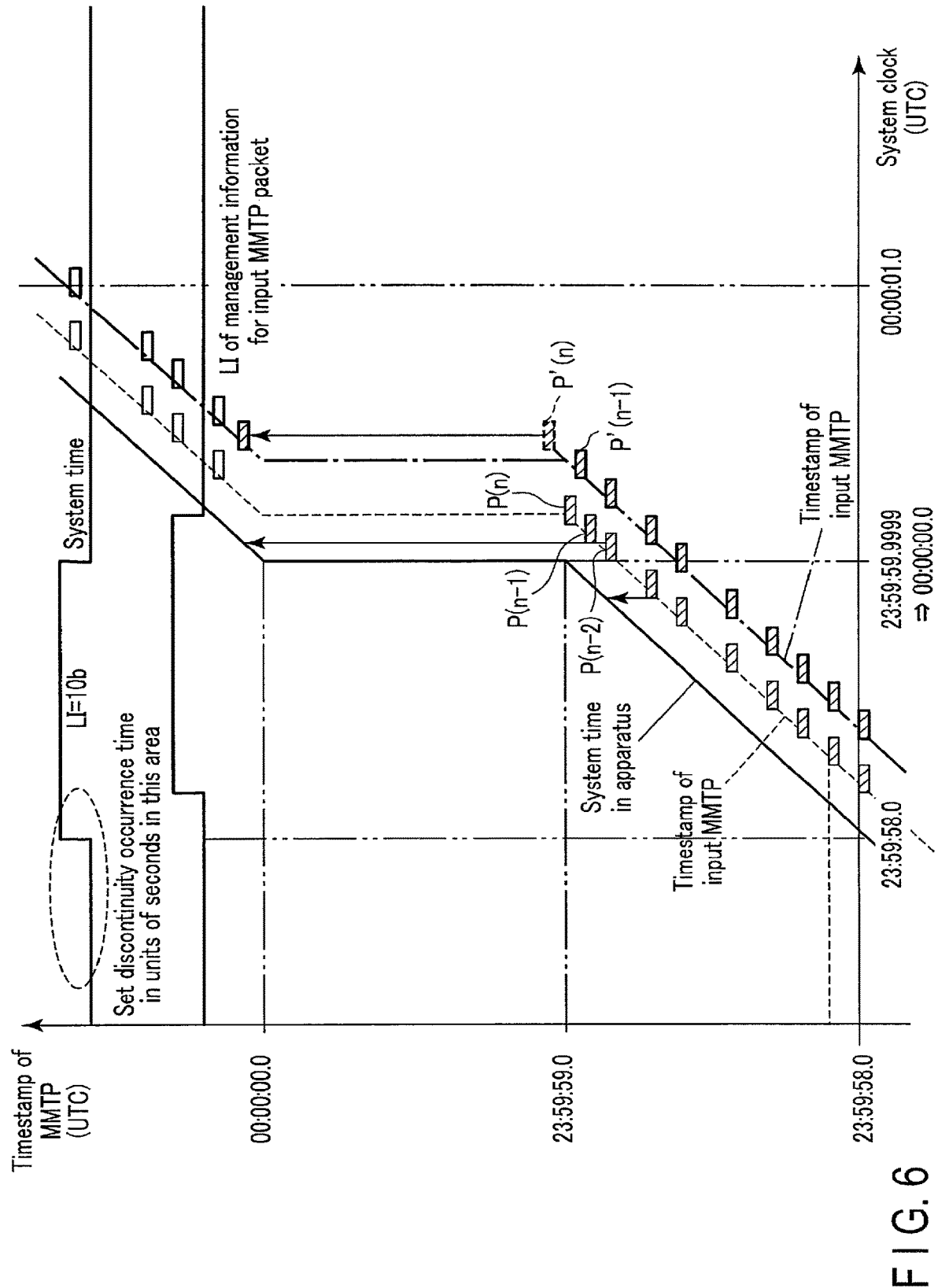
F I G. 6

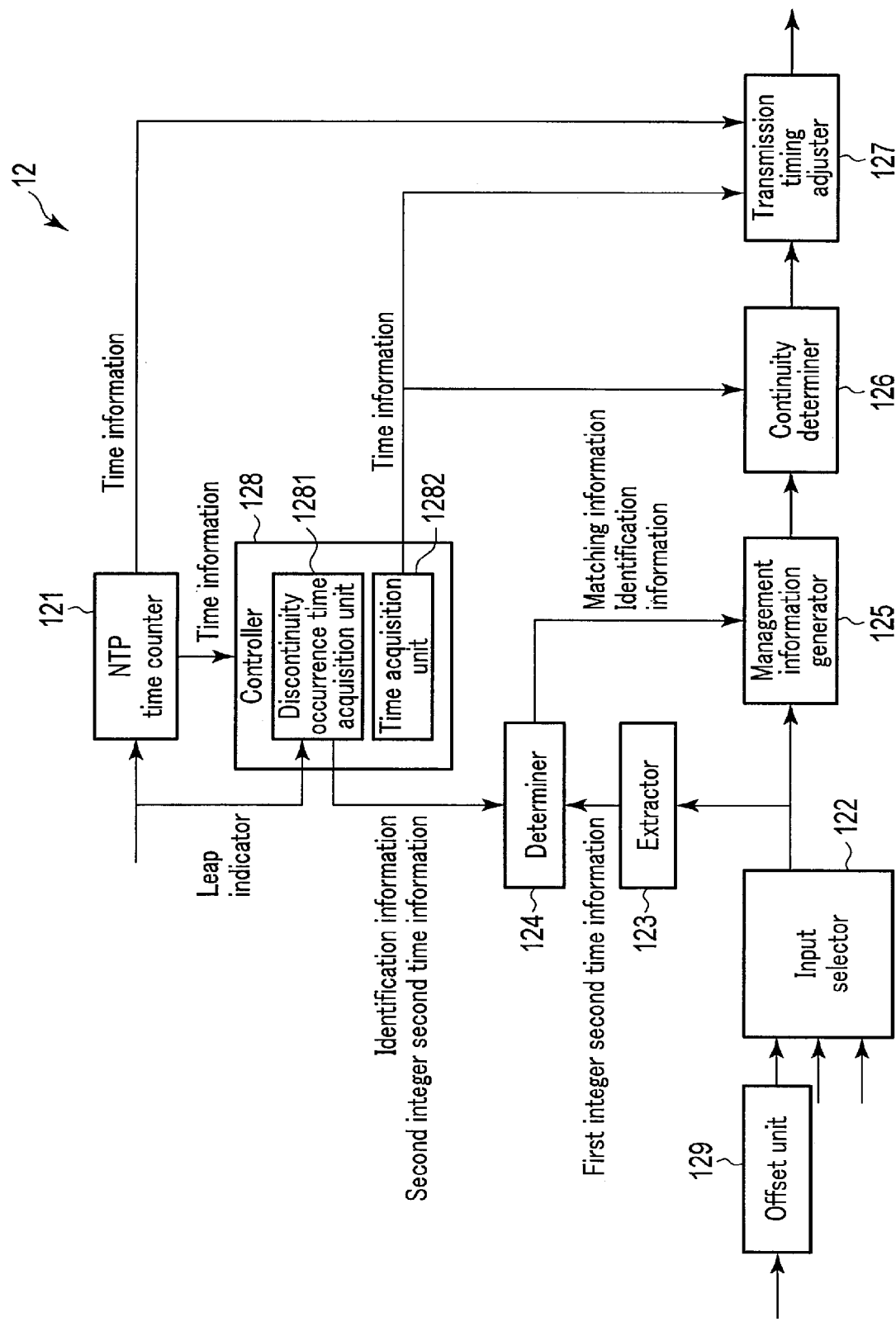
F I G. 7

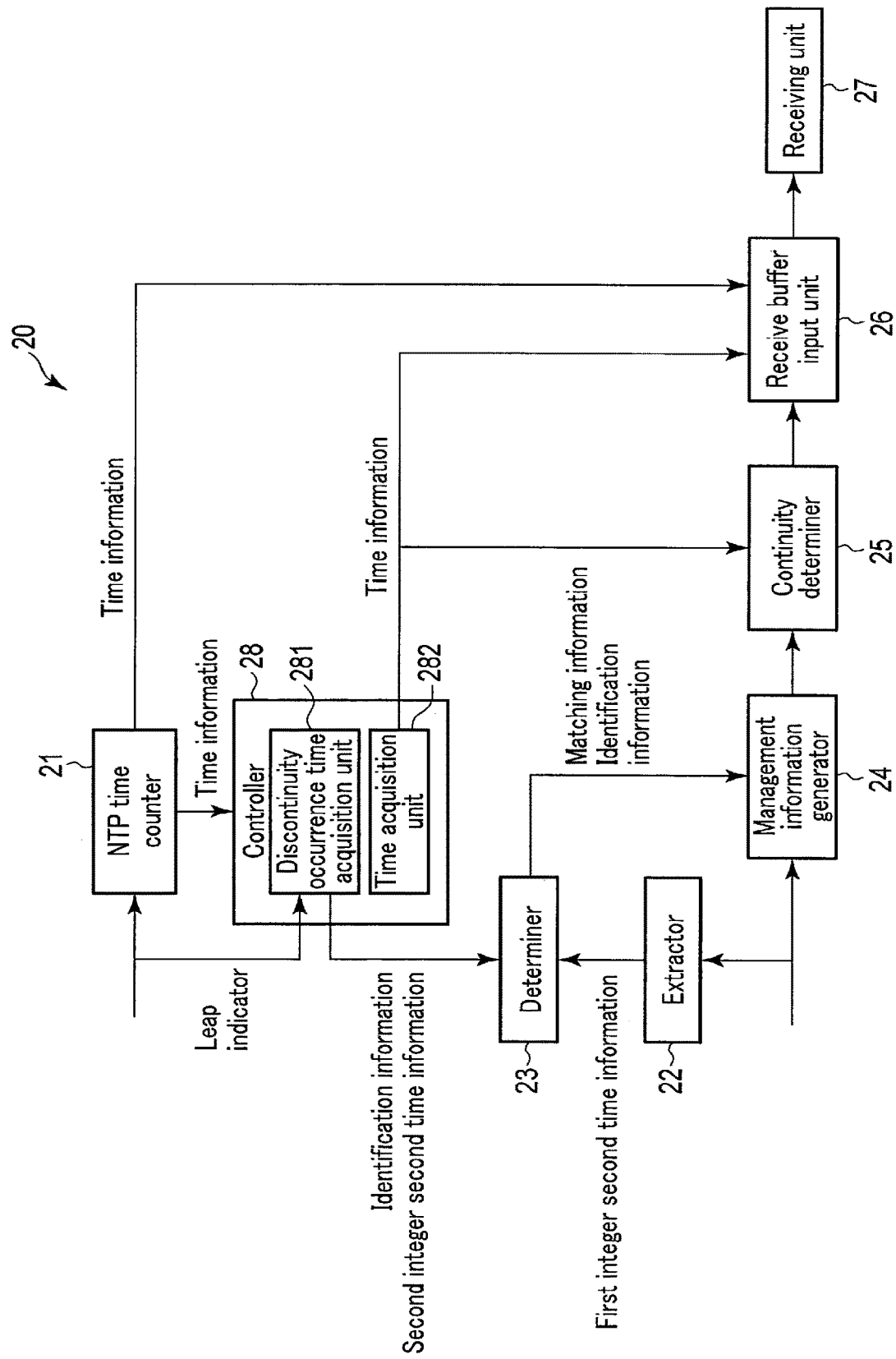
F I G. 8

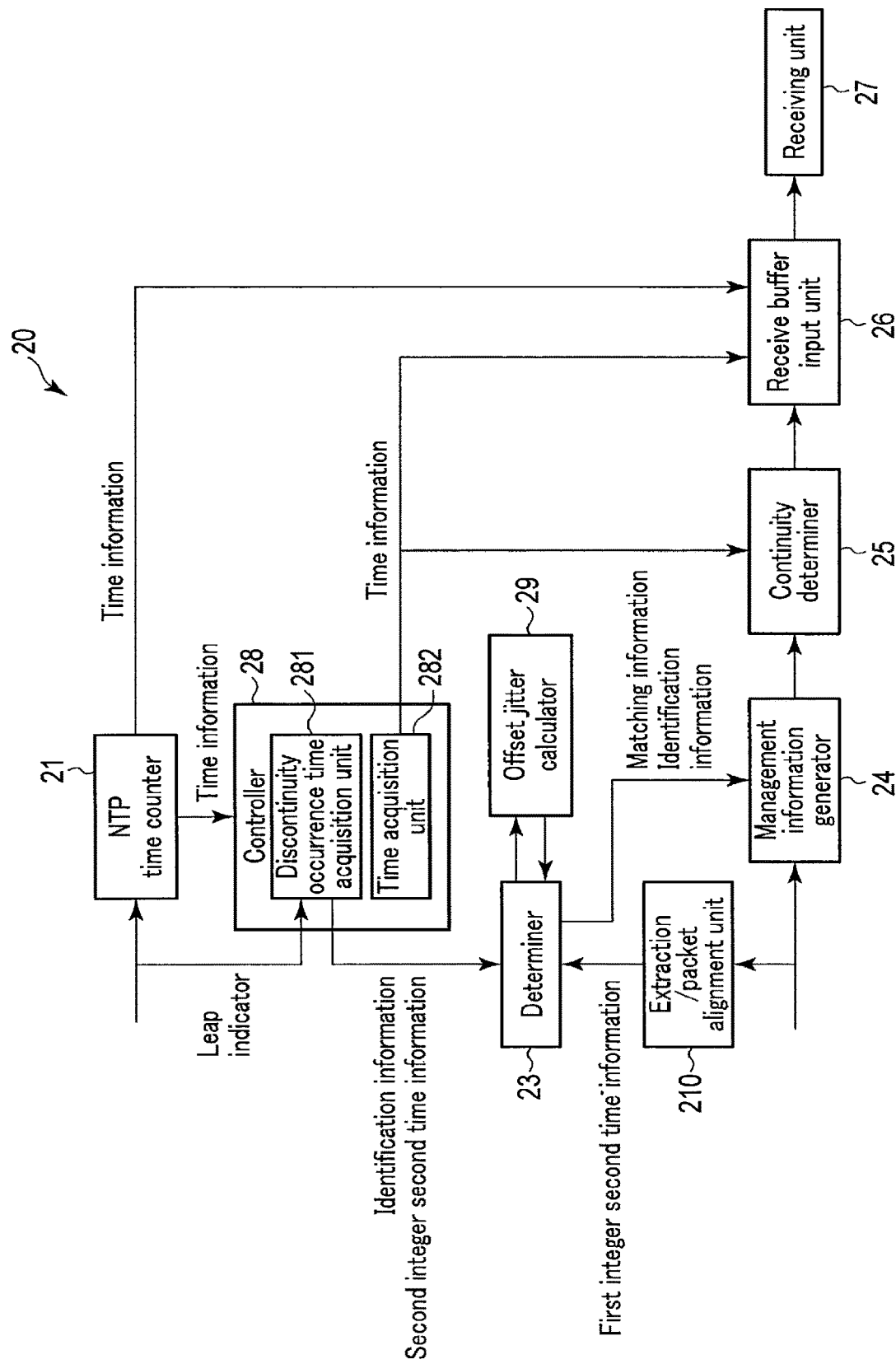
F I G. 11

_US 10,721,008 B2_

TRANSMITTING SYSTEM, MULTIPLEXING APPARATUS, AND LEAP SECOND CORRECTION METHOD

CROSS-REFERENCE TO RELATED APPLICATIONS

This application is a Continuation Application of PCT Application No. PCT/JP2015/083887, filed Dec. 2, 2015 and based upon and claims the benefit of priority from prior Japanese Patent Application No. 2015-048417, filed Mar. 11, 2015, the entire contents of which are incorporated herein by reference.

FIELD

Embodiments described herein relate to a transmitting system, a multiplexing apparatus, and a leap second correction method.

BACKGROUND

In the current broadcasting system, media transport schemes of a Moving Picture Experts Group-2 Transport Stream (MPEG-2 TS) scheme and a Real-time Transport Stream (RTP) scheme have been widely used. In these schemes, when attempting to cooperatively operate broadcasting and communication, various limitations arise. Accordingly, MPEG Media Transport (MMT) has been proposed as a new media transport scheme under the use of a variety of networks utilizing MPEG.

In the MMT standards (ISO/IEC 23008-1), a Network Time Protocol (NTP) timestamp of a 32-bit short format is included in a header of an MPEG Media Transport Protocol (MMTP) packet. An NTP short format timestamp includes 16-bit integer second time information and 16-bit decimal second time information. In the MMT standards, an MMTP packet does not include an indicator corresponding to leap second information. The leap second information is a leap indicator included in a Network Time Protocol (NTP) packet, that indicates insertion or deletion of a leap second.

An MMTP packet includes an NTP short format timestamp in a header, and does not include an indicator corresponding to leap second information. Accordingly, an apparatus which adopts the MMT standards cannot identify a discontinuity occurrence time due to insertion or deletion of a leap second. Thus, when an MMTP packet is transmitted around a leap second occurrence, a transmitter which adopts the MMT standards may not be able to transmit MMTP packets in a correct order. In addition, when an MMTP packet is received around a leap second occurrence, a receiver which adopts the MMT standards may not be able to receive MMTP packets in a correct order. When a video or audio clock is reproduced by a phase lock loop (PLL) utilizing NTP, etc., in the transmitter or the receiver, clock synchronization is not successfully performed during leap second correction, which results in incorrect reproduction of a subcarrier of a National Television System Committee (NTSC), or reduction of audio quality due to greater wow and flutter.

BRIEF DESCRIPTION OF THE DRAWINGS

FIG. 1 is a block diagram showing a functional configuration of a transmitting system and a receiver according to the present embodiment.

FIG. 2 illustrates a data structure of an MMTP packet according to the present embodiment.

FIG. 4 is a flowchart of the operation when the multiplexing apparatus shown in FIG. 3 transmits an MMTP packet, in consideration of leap second correction.

FIG. 5 is a diagram explaining the operation of the multiplexing apparatus when a leap second is inserted.

FIG. 6 is a diagram explaining the operation of the multiplexing apparatus when a leap second is deleted.

FIG. 7 is a block diagram showing another example of functional configuration of the multiplexing apparatus shown in FIG. 1.

FIG. 8 is a block diagram showing a functional configuration of the receiver shown in FIG. 1.

FIG. 11 is a block diagram showing another example of a functional configuration of the receiver shown in FIG. 1.

DETAILED DESCRIPTION

Figure 3:
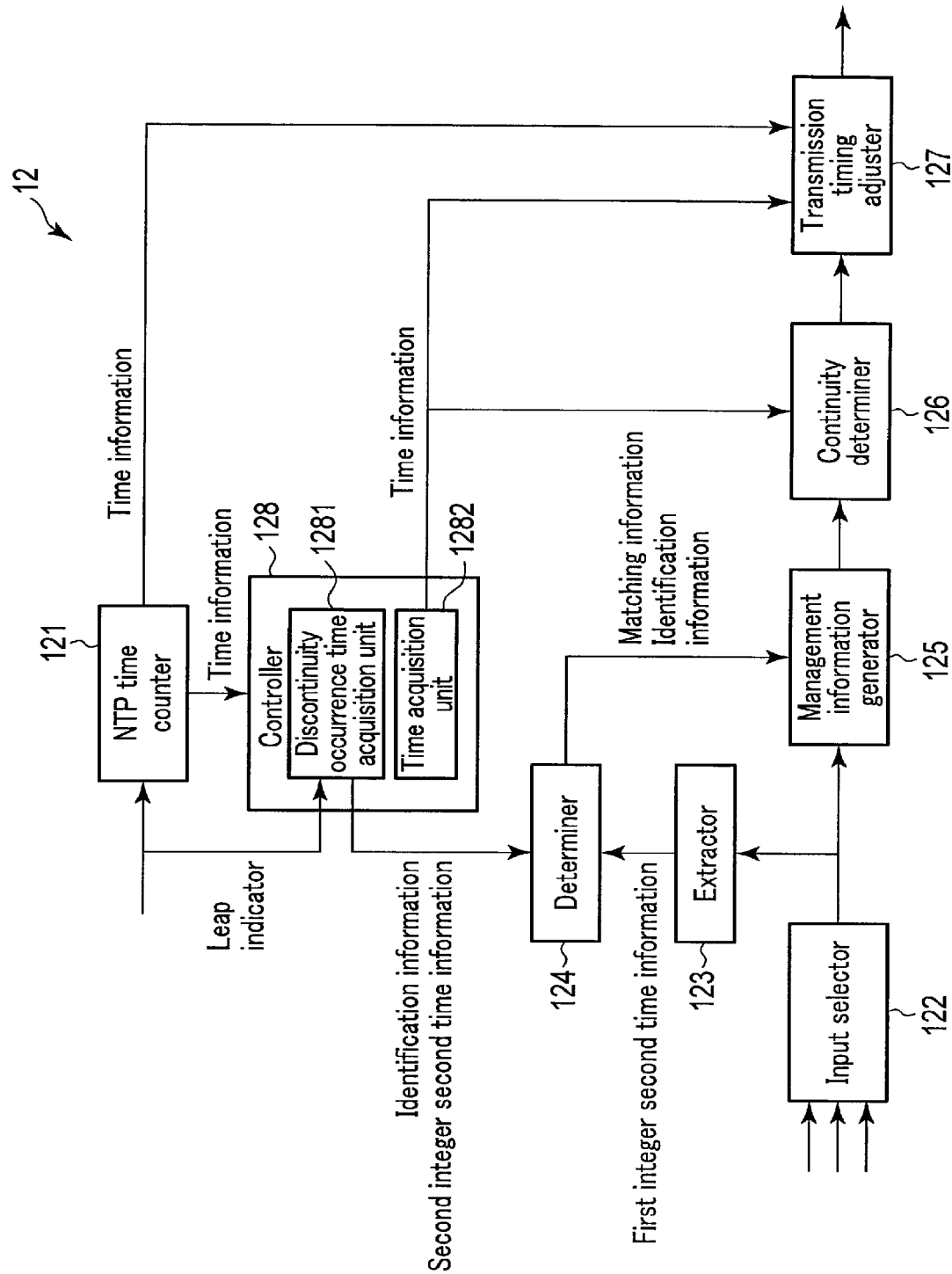
FIG. 3 is a block diagram showing a functional configuration of a multiplexing apparatus shown in FIG. 1.

In general, according to an embodiment, a transmitting system includes an outputting apparatus and a multiplexing apparatus. The outputting apparatus transmits MPEG Media Transport Protocol (MMTP) packets to which a Network Time Protocol (NTP) short format timestamp is added. The multiplexing apparatus multiplexes the MMTP packets. The multiplexing apparatus includes an extractor, a controller, a determiner, a management information generator, a continuity determiner, and a transmission timing adjuster. The extractor extracts first integer second time information from the NTP short format timestamp added to an MMTP packet transmitted from the outputting apparatus. The controller acquires information relating to a leap second processing and second integer second time information corresponding to a discontinuity occurrence time that occurred due to leap second correction, based on information concerning a leap second included in NTP packets and time information acquired based on NTP. The determiner determines whether the first integer second time information matches the second integer second time information. The management information generator generates, in response to a determination that the first integer second time information matches the second integer second time information, matching information indicating the match and identification information relating to the leap second processing. The continuity determiner determines whether the MMTP packet is close to an MMTP packet in which an NTP short format timestamp value is discontinuous, based on the matching information, the identification information, and a difference between a value of the NTP short format timestamp and the time information acquired based on the NTP. The transmission timing adjuster adjusts a transmission timing of a MMTP packet transmitted from the outputting apparatus. The transmission timing adjuster writes, for adjustment of a transmission timing of the MMTP packet being close to the MMTP packet in which the NTP short format timestamp value is discontinuous, time information taking the leap second processing into consideration, to the NTP short format timestamp of the MMTP packet.

Hereinafter, embodiments will be described with reference to the drawings.

FIG. 1 is a block diagram showing an example of a functional configuration of a transmitting system 10 and a receiver 20 according to the present embodiment. The transmitting system 10 shown in FIG. 1 transmits a multiplexed packet in which an MMTP packet is multiplexed. The transmitted multiplexed packet arrives at the receiver 20 through a transmission path such as a broadcast network etc., and is received by the receiver 20.

[Transmitting System 10]

The transmitting system 10 includes a material outputting apparatus 11, a multiplexing apparatus 12, and a transmitter 13.

The material outputting apparatus 11 includes, for example, a Central Processing Unit (CPU), a Field Programmable Gate Array (FPGA) which performs a predetermined processing based on control by the CPU, and a storage memory, etc. for storing data. The material outputting apparatus 11 implements a function, for example, as a video encoder, an audio encoder, etc., by the CPU executing functions designed in the FPGA. The video encoder, for example, encodes video data stored in the storage memory to form an MMTP packet of the video. The audio encoder encodes, for example, audio data stored in the storage memory to form an MMTP packet of audio. The material outputting apparatus 11 outputs to the multiplexing apparatus 12 multiple kinds of MMTP packets for video images and audio, etc.

The material outputting apparatus 11 may include a Large-Scale Integration (LSI) instead of the FPGA. The material outputting apparatus 11 may also perform a predetermined processing by the CPU that executes software processing.

FIG. 2 illustrates a data structure of an MMTP packet according to the present embodiment. A header of the MMTP packet includes an NTP timestamp of a 32-bit short format. An NTP short format timestamp includes 16-bit integer second time information and 16-bit decimal second time information. The NTP short format timestamp indicates a time when the MMTP packet is output from the material outputting apparatus 11, which is a device of the preprocessing stage, for example.

The multiplexing apparatus 12 includes, for example, a CPU, and an FPGA which performs a predetermined processing in accordance with control by the CPU, etc. FIG. 3 is a block diagram showing a functional configuration of the multiplexing apparatus 12 shown in FIG. 1. The functions of an NTP time counter 121, an input selector 122, an extractor 123, a determiner 124, a management information generator 125, a continuity determiner 126, and a transmission timing adjuster 127 shown in FIG. 3 are implemented by the CPU executing functions designed in the FPGA. The controller 128 shown in FIG. 3 is configured by the CPU. The multiplexing apparatus 12 may include an LSI instead of the FPGA, in order to implement the functions shown in FIG. 3. The multiplexing apparatus 12 may implement the functions shown in FIG. 3 by the CPU executing the software processing.

The NTP time counter 121 includes a Real Time Clock (RTC), and generates time information at the multiplexing apparatus 12. The NTP time counter 121 outputs the generated time information to the transmission timing adjuster 127 and the controller 128.

The NTP time counter 121 receives an NTP packet transmitted from an NTP server (not shown in the drawings), and adjusts time information, based on the received NTP packet. The NTP packet includes a 64-bit NTP long format timestamp including 32-bit integer second time information and 32-bit decimal second time information. The NTP packet also includes leap second information (leap indicator) that indicates insertion or deletion of a leap second.

The input selector 122 receives a plurality of MMTP packets output from the material outputting apparatus 11. The input selector 122 may also receive MMTP packets output from an apparatus other than the material outputting apparatus 11, in parallel with the MMTP packets from the material outputting apparatus 11. The input selector 122 includes, for example, a ring buffer (not shown in the drawings) to temporarily store the received MMTP packets. The controller 128 generates management information when the MMTP packets are to be stored in the ring buffer. The management information is information to manage the MMTP packets stored in the buffer. The management information includes, for example, a timestamp, a head address, and the size of an MMTP packet stored in the buffer.

The input selector 122 selects MMTP packets in order of the timestamp value, from smallest to largest among the received MMTP packets, and sequentially outputs the selected MMTP packets to the extractor 123 and the management information generator 125. If a plurality of MMTP packets having the same timestamp value are received, the input selector 122 selects the MMTP packets in the order according to a predetermined rule. If the received MMTP packets include an MMTP packet having a particular priority, the MMTP packet may be preferentially selected.

The extractor 123 extracts 16-bit integer second time information from an NTP short format timestamp added to an MMTP packet output from the input selector 122. The extractor 123 outputs the extracted integer second time information to the determiner 124 as first integer second time information.

The controller 128 is implemented, for example, by the processing of the CPU, and controls the operation of the multiplexing apparatus 12. The controller 128 implements the functions of a discontinuity occurrence time acquisition unit 1281 and a time acquisition unit 1282 by the CPU executing a predetermined program.

The discontinuity occurrence time acquisition unit 1281 receives 32-bit integer time information output from the NTP time counter 121 and leap second information included in the NTP packet. In the NTP server, a leap second is inserted after 23:59:59 in Coordinated Universal Time (UTC) on December 31 or June 30 of a predetermined year, and a leap second is deleted by omitting 23:59:59 UTC on December 31 or June 30 of a predetermined year. The leap second information may be transmitted from the NTP server, for example, from one month prior to the time when a leap second is to be inserted or deleted.

The discontinuity occurrence time acquisition unit 1281 determines a discontinuity occurrence time as described below. In the present embodiment, the discontinuity occurrence time is a time when a discontinuity in time due to the leap second correction is found.

Specifically, the discontinuity occurrence time acquisition unit 1281 determines that 23:59:59 on December 31, or June 30 closest to the reception of the leap second information is a discontinuity occurrence time, based on the leap second information indicating the insertion of a leap second and 32-bit integer second time information output from the NTP time counter 121. The discontinuity occurrence time acquisition unit 1281 determines that 23:59:58 on December 31, or June 30 closest to the reception of the leap second information is a discontinuity occurrence time, based on the leap second information indicating deletion of a leap second and 32-bit integer second time information output from the NTP time counter 121.

The discontinuity occurrence time acquisition unit 1281 outputs to the determiner 124 identification information relating to leap second processing (insertion or deletion) and lower 16-bit integer second time information corresponding to the discontinuity occurrence time, upon acquisition of the discontinuity occurrence time. The lower 16-bit integer second time information corresponding to the discontinuity occurrence time is referred to as second integer second time information in the following explanation. The discontinuity occurrence time acquisition unit 1281 outputs the identification information and the second integer second time information to the determiner 124, for example, a few minutes prior to the discontinuity occurrence time.

The time acquisition unit 1282 acquires time information in the form corresponding to the NTP short format timestamp from the NTP time counter 121. The time information indicates, for example, lower 16-bit integer time information and upper 16-bit decimal second time information in an NTP long format timestamp. The time acquisition unit 1282 outputs the acquired time information to the continuity determiner 126 and the transmission timing adjuster 127.

The determiner 124 receives identification information relating to leap second processing and the second integer second time information output from the discontinuity occurrence time acquisition unit 1281, and records the received identification information and second integer second time information. The determiner 124 receives the first integer second time information sequentially output from the extractor 123. The determiner 124 determines whether the received first integer second time information matches the recorded second integer second time information. If the received first integer second time information matches the recorded second integer second time information, the determiner 124 outputs matching information indicating the match and identification information relating to leap second processing to the management information generator 125.

The management information generator 125 adds the matching information and identification information output from the determiner 124 to management information corresponding to the MMTP packet output from the input selector 122.

The continuity determiner 126 determines continuity of MMTP packets, and deletes the matching information and the identification information from the management information corresponding to an MMTP packet in which a discontinuity in time is found and the subsequent MMTP packets. That is, the continuity determiner 126 calculates a difference between an NTP short format timestamp added to an MMTP packet and time information acquired by the time acquisition unit 1282 of the controller 128. The MMTP packet output from the material outputting apparatus 11, which is a device of the preprocessing stage, reaches the multiplexing apparatus 12 later than an ideal timing due to a switching operation, etc. Accordingly, if a leap second is not inserted or deleted, the value of the NTP short format timestamp added to the MMTP packet is smaller than the value of the time information acquired by the time acquisition unit 1282. The continuity determiner 126 reads the management information and examines the management information. If the management information includes matching information and identification information indicating insertion of a leap second, the continuity determiner 126 detects a change in a sign of the calculated difference. For the case where the sign of the calculated difference changes from positive to negative to positive, the continuity determiner 126 determines that a value of the NTP short format timestamp added to the MMTP packet is discontinuous at the time when the sign of the difference changes from negative to positive. If it is determined that the NTP short format timestamp value for the MMTP packet is discontinuous, the continuity determiner 126 deletes the matching information and the identification information from the management information corresponding to the MMTP packet and the subsequent MMTP packets.

If the management information includes matching information and identification information indicating deletion of a leap second, the continuity determiner 126 detects a change in a value of the calculated difference. For the case where the value of the calculated difference changes from a value less than one second to a value greater than one second, and to a value less than one second, the continuity determiner 126 determines that the NTP short format timestamp value for the MMTP packet is discontinuous at the time when the value of the difference changes from a value greater than one second to a value less than one second. If it is determined that the NTP short format timestamp value for the MMTP packet is discontinuous, the continuity determiner 126 deletes the matching information and the identification information from the management information corresponding to the MMTP packet and the subsequent MMTP packets.

The transmission timing adjuster 127 reads the MMTP packet from the buffer. The transmission timing adjuster 127 determines whether or not the NTP short format timestamp value for the MMTP packet is required to be rewritten. For example, if the NTP short format timestamp in two MMTP packets simultaneously input to the input selector 122 indicates the same time, the two MMTP packets cannot be output simultaneously after multiplexing. That is, one of the MMTP packets, which is a first MMTP packet, is output first, and then another MMTP packet, which is a second MMTP packet, is output. For this operation, the transmission timing adjuster 127 rewrites the NTP short format timestamp value of the second MMTP packet. The transmission timing adjuster 127 rewrites the NTP short format timestamp value of the second MMTP packet based on the transmission rate for transmitting MMTP packets to the transmitter 13, and the packet size of the first MMTP packet, which is transmitted immediately before the second MMTP packet, by referring to 32-bit integer second time information and 32-bit decimal second time information output from the NTP time counter 121. The transmission timing adjuster 127 transmits to the transmitter 13 the MMTP packet read from the buffer as a multiplexed packet in accordance with the NTP short format timestamp added thereto.

When reading the MMTP packet from the buffer, the transmission timing adjuster 127 reads matching information and identification information included in management information. The transmission timing adjuster 127 calculates a difference between the NTP short format timestamp value of the MMTP packet and time information acquired by the time acquisition unit 1282 of the controller 128. In the case where the transmission timing adjuster 127 reads matching information and identification information indicating insertion of a leap second, and a sign of the calculated difference is negative, the transmission timing adjuster 127 determines whether the rewritten NTP short format timestamp value exceeds 00:00:00. In the present embodiment, 00:00:00 indicates the time when a date changes. If the rewritten NTP short format timestamp value exceeds 00:00:00, the transmission timing adjuster 127 reduces the rewritten NTP short format timestamp value by one second.

In the case where the transmission timing adjuster 127 reads matching information and identification information indicating deletion of a leap second, and a value of the calculated difference is greater than one second, the transmission timing adjuster 127 determines whether the rewritten NTP short format timestamp value exceeds 23:59:59. If the rewritten NTP short format timestamp value exceeds 23:59:59, the transmission timing adjuster 127 increases the rewritten NTP short format timestamp value by one second.

The transmitter 13 performs transmission processing to the MMTP packet output from the multiplexing apparatus 12. The transmitter 13 transmits the MMTP packet subjected to the transmission processing.

Next, the operation when the multiplexing apparatus 12 having the aforementioned configuration transmits an MMTP packet taking leap second correction into consideration will be explained. FIG. 4 is a flowchart of the operation when the multiplexing apparatus 12 transmits MMTP packets, taking leap second correction into consideration. It is assumed that the discontinuity occurrence time acquisition unit 1281 of the controller 128 outputs in advance identification information relating to leap second processing (insertion or deletion) and lower 16-bit of integer second time information (second integer second time information) corresponding to the discontinuity occurrence time to the determiner 124.

FIG. 5 explains an example of the operation of the multiplexing apparatus 12 when a leap second is inserted. FIG. 6 explains an example of the operation of the multiplexing apparatus 12 when a leap second is deleted. In FIGS. 5 and 6, the horizontal axis represents a time for a system clock (UTC) counted at the NTP time counter 121, and the vertical axis represents a time for a timestamp of a MMTP packet. In FIGS. 5 and 6, a solid line represents a system clock counted at the NTP time counter 121, a broken line represents a time indicated by a timestamp of an MMTP packet received at the input selector 122, and an alternating long and short dashed line represents a time indicated by a timestamp of an MMTP packet transmitted by the transmission timing adjuster 127.

First, the input selector 122 receives a plurality of MMTP packets. In FIGS. 5 and 6, MMTP packets P(n−2), P(n−1) and P(n) received by the input selector 122 have timestamps, the values of which are close to each other, and accordingly, the timing for transmission of these packets is required to be adjusted. The input selector 122 selects MMTP packets in order of the timestamp value, from smallest to largest, among the received plurality of MMTP packets (step S41).

The extractor 123 extracts 16-bit integer second time information from an NTP short format timestamp added to an MMTP packet selected by the input selector 122, as first integer second time information (step S42).

The determiner 124 determines whether the first integer second time information extracted by the extractor 123 matches the recorded second integer second time information (step S43). If the first integer second time information matches the second integer second time information (Yes in step S43), the determiner 124 reports matching information indicating the match and identification information relating to leap second processing to the management information generator 125. The management information generator 125 adds the matching information and identification information output from the determiner 124 to management information corresponding to the MMTP packet (step S44).

The continuity determiner 126 determines continuity of MMTP packets by referring to the management information (step S45). If the MMTP packets are continuous (Yes in step S45), the transmission timing adjuster 127 reads the MMTP packet from the buffer (step S46). If the MMTP packets are not continuous (No in step S45), the continuity determiner 126 deletes matching information and identification information from management information corresponding to the MMTP packet to which a discontinuity in time is found and the subsequent MMTP packets (step S47), and the processing proceeds to step S46. By this processing, the matching information and the identification information are deleted from the management information corresponding to MMTP packet P(n) and the subsequent MMTP packets as shown in FIGS. 5 and 6. In FIGS. 5 and 6, the management information corresponding to the packets indicated as shaded boxes includes matching information and identification information.

The transmission timing adjuster 127 determines whether or not the NTP short format timestamp added to the MMTP packet is required to be rewritten (step S48). If rewriting is not necessary (No in step S48), the transmission timing adjuster 127 outputs the MMTP packet to the transmitter 13 as a multiplexed packet, in accordance with the NTP short format timestamp (step S49), and the processing is terminated. When rewriting is necessary (Yes in step S48), the transmission timing adjuster 127 rewrites the NTP short format timestamp value (step S410).

The transmission timing adjuster 127 determines whether or not the MMTP packet in which the NTP short format timestamp value is rewritten satisfies a first condition (step S411). The first condition is that matching information and identification information indicating insertion of a leap second are read, and the sign of the calculated difference is negative. If the MMTP packet satisfies the first condition (Yes in step S411), the transmission timing adjuster 127 determines whether or not the rewritten timestamp value exceeds 00:00:00 (step S412). When the rewritten timestamp value exceeds 00:00:00 (Yes in step S412), the transmission timing adjuster 127 further rewrites the rewritten timestamp value to reduce the value by one second (step S413), and the processing proceeds to step S49. When the rewritten timestamp value does not exceed 00:00:00 (No in step S412), the transmission timing adjuster 127 proceeds to step S49.

In FIG. 5, MMTP packets P(n−2), P(n−1) and P(n) have timestamps, the values of which are close to each other, and accordingly, the timing for transmission of these packets is required to be adjusted. The transmission timing adjuster 127 rewrites the timestamp of the MMTP packet P(n−1) so that the MMTP packet P(n−1) is transmitted at the timing of the MMTP packet P'(n−1) indicated on the alternating long and short dashed line. The transmission timing adjuster 127 rewrites the timestamp of the MMTP packet P(n) so that the MMTP packet P(n) is transmitted at the timing of the MMTP packet P'(n) indicated on the alternating long and short dashed line.

Since the MMTP packets P'(n−1) and P'(n) satisfy the first condition, the transmission timing adjuster 127 determines whether the rewritten timestamp values exceed 00:00:00. Since the timestamp of the MMTP packet P'(n) exceeds 00:00:00, the transmission timing adjuster 127 rewrites the timestamp value of the MMTP packet P'(n) to reduce the value by one second.

In step S411, if the MMTP packet does not satisfy the first condition (No in step S411), the transmission timing adjuster 127 determines whether or not the MMTP packet satisfies a second condition (step S414). The second condition is that matching information and identification information indicating deletion of a leap second are read, and the value of the calculated difference is greater than one second. If the MMTP packet satisfies the second condition (Yes in step S414), the transmission timing adjuster 127 determines whether or not the rewritten timestamp value exceeds 23:59:59 (step S415). If the rewritten timestamp value exceeds 23:59:59 (Yes in step S415), the transmission timing adjuster 127 further rewrites the rewritten timestamp value to increase the value by one second (step S416), and the processing proceeds to step S49. If the rewritten timestamp value does not exceed 23:59:59 (No in step S415), the transmission timing adjuster 127 proceeds to step S49.

In FIG. 6, MMTP packets P(n−2), P(n−1), and P(n) have timestamps the values of which are close to each other, and accordingly, the timing for transmission of these packets is required to be adjusted. The transmission timing adjuster 127 rewrites the timestamp of the MMTP packet P(n−1) so that the MMTP packet P(n−1) is transmitted at the timing of the MMTP packet P'(n−1) indicated on the alternating long and short dashed line. The transmission timing adjuster 127 rewrites the timestamp of the MMTP packet P(n) so that the MMTP packet P(n) is transmitted at the timing of the MMTP packet P'(n) indicated on the alternating long and short dashed line.

Since the MMTP packets P'(n−1) and P'(n) satisfy the second condition, the transmission timing adjuster 127 determines whether the rewritten timestamps exceed 23:59:59. Since the timestamp value of the MMTP packet P'(n) exceeds 23:59:59, the transmission timing adjuster 127 rewrites the timestamp value of the MMTP packet P'(n) to increase the value by one second.

In step S43, if the first integer second time information extracted by the extractor 123 does not match the recorded second integer second time information (No in step S43), the processing proceeds to step S46.

As stated above, in the multiplexing apparatus 12 according to the present embodiment, the determiner 124 determines whether or not the first integer second time information output from the extractor 123 matches the second integer second time information output from the discontinuity occurrence time acquisition unit 1281. If the first integer second time information matches the second integer second time information, the management information generator 125 adds matching information indicating the match and identification information relating to the leap second processing to the management information. The continuity determiner 126 specifies a plurality of MMTP packets close to an MMTP packet in which a timestamp value is discontinuous, based on the matching information and the identification information included in the management information, and the difference between NTP short format timestamp values added to MMTP packets and time information acquired by the time acquisition unit 1282 of the controller 128. If the timestamp values of the specified MMTP packets are rewritten to a time not taking leap second correction into consideration, the transmission timing adjuster 127 further rewrites the timestamp values taking leap second correction into consideration. By this processing, the order of MMTP packets is correctly maintained.

Thus, according to the transmitting system 10 and the multiplexing apparatus 12 of the present embodiment, MMTP packets can be transmitted in the correct order even if a leap second is inserted or deleted. Accordingly, in the case where a video or audio clock is reproduced by PLL utilizing NTP, etc., in a transmitter or a receiver, clock synchronization during leap second correction is successfully performed. By this processing, a subcarrier of NTSC can be correctly reproduced, and audio wow and flutter can be suppressed.

The multiplexing apparatus 12 according to the present embodiment may include an offset unit 129 as a preprocessing device of the input selector 122, as shown in FIG. 7. There may be a case where the delayed time of a predetermined MMTP packet is greater than the delayed time of other MMTP packets. The offset unit 129 sets an offset value with which the difference of the delayed time between MMTP packets can be reduced.

In the present embodiment, the case where the discontinuity occurrence time acquisition unit 1281 outputs identification information relating to the leap second processing (insertion or deletion) and lower 16-bit of integer second time information corresponding to the discontinuity occurrence time to the determiner 124, upon acquisition of the discontinuity occurrence time is explained. However, the embodiment is not limited thereto. The discontinuity occurrence time acquisition unit 1281 may output lower 16-bit integer second time information among the 32-bit integer second time information output from the NTP time counter 121 to the determiner 124 when the leap second information does not indicate leap second processing. In this case, the discontinuity occurrence time acquisition unit 1281 outputs to the determiner 124 the identification information indicating that there is no leap second processing to be performed.

[Receiver 20]

FIG. 8 is a block diagram showing the functional configuration of the receiver 20 shown in FIG. 1. The receiver 20 includes, for example, a CPU, an FPGA which performs a predetermined processing based on control by the CPU, and a storage memory for storing data. The functions of the NTP time counter 21, the extractor 22, the determiner 23, the management information generator 24, the continuity determiner 25, a receive buffer input unit 26, and a receiving unit 27 shown in FIG. 8 are implemented by the CPU executing functions designed in the FPGA. The controller 28 shown in FIG. 8 is configured by the CPU. The receiver 20 may include an LSI instead of the FPGA in order to implement the functions shown in FIG. 8. The receiver 20 may implement the functions shown in FIG. 8 by the CPU executing the software processing.

The NTP time counter 21 includes an RTC, and generates time information at the receiver 20. The NTP time counter 21 outputs the generated time information to the receive buffer input unit 26 and the controller 28.

The NTP time counter 21 receives an NTP packet transmitted from an NTP server (not shown in the drawings), and adjusts time information, based on the received NTP packet. The NTP packet includes a 64-bit NTP long format timestamp including 32-bit integer second time information and 32-bit decimal second time information. The NTP packet also includes leap second information (leap indicator) that indicates the insertion or deletion of a leap second.

The extractor 22 extracts 16-bit integer second time information from an NTP short format timestamp added to an MMTP packet received at the receiver 20. The extractor 22 outputs the extracted integer second time information to the determiner 23 as first integer second time information.

The controller 28 is implemented, for example, by the processing of the CPU, and controls the operation of the receiver 20. The controller 28 implements the functions of the discontinuity occurrence time acquisition unit 281 and the time acquisition unit 282 by the CPU executing a predetermined program.

The discontinuity occurrence time acquisition unit 281 receives 32-bit integer time information output from the NTP time counter 21 and leap second information included in the NTP packet.

The discontinuity occurrence time acquisition unit 281 determines a discontinuity occurrence time as described below.

Specifically, the discontinuity occurrence time acquisition unit 281 determines that 23:59:59 on December 31, or June 30 closest to the reception of the leap second information is a discontinuity occurrence time, based on the leap second information indicating insertion of a leap second, and 32-bit integer second time information output from the NTP time counter 21. The discontinuity occurrence time acquisition unit 281 determines that 23:59:58 on December 31, or June 30 closest to the reception of the leap second information is a discontinuity occurrence time, based on the leap second information indicating deletion of a leap second and 32-bit integer second time information output from the NTP time counter 21.

The discontinuity occurrence time acquisition unit 281 outputs to the determiner 23 identification information relating to leap second processing (insertion or deletion) and lower 16-bit integer second time information corresponding to the discontinuity occurrence time, upon acquisition of the discontinuity occurrence time. The lower 16-bit integer second time information corresponding to the discontinuity occurrence time is referred to as second integer second time information in the following explanation. The discontinuity occurrence time acquisition unit 281 outputs the identification information and the second integer second time information to the determiner 23, for example, a few minutes prior to the discontinuity occurrence time.

The time acquisition unit 282 acquires time information in the form corresponding to the NTP short format timestamp from the NTP time counter 21. The time information indicates, for example, lower 16-bit integer time information and upper 16-bit decimal second time information in an NTP long format timestamp. The time acquisition unit 282 outputs the acquired time information to the continuity determiner 25 and the receive buffer input unit 26.

The determiner 23 receives identification information relating to leap second processing and the second integer second time information output from the discontinuity occurrence time acquisition unit 281, and records the received identification information and second integer second time information. The determiner 23 receives the first integer second time information sequentially output from the extractor 22. The determiner 23 determines whether the received first integer second time information matches the recorded second integer second time information. If the received first integer second time information matches the recorded second integer second time information, the determiner 23 outputs matching information indicating the match and identification information relating to leap second processing to the management information generator 24.

The management information generator 24 adds the matching information and identification information output from the determiner 23 to management information corresponding to the MMTP packet received at the receiver 20. The receive buffer input unit 26 described later includes, for example, a ring buffer to temporarily store the received MMTP packets. The management information is information to manage the MMTP packets stored in the buffer. The management information includes, for example, a timestamp, a head address, and the size of an MMTP packet to be stored in the buffer.

The continuity determiner 25 determines the continuity of MMTP packets, and deletes the matching information and the identification information from the management information corresponding to an MMTP packet in which a discontinuity in time is found and the subsequent MMTP packets. That is, the continuity determiner 25 calculates a difference between the NTP short format timestamp added to an MMTP packet and time information acquired by the time acquisition unit 282 of the controller 28. The continuity determiner 25 reads the management information and examines the management information. If the management information includes matching information and identification information indicating the insertion of a leap second, the continuity determiner 25 detects a change in a sign of the calculated difference. For the case where the sign of the calculated difference changes from positive to negative to positive, the continuity determiner 25 determines that a value of the NTP short format timestamp added to the MMTP packet is discontinuous at the time when the sign of the difference changes from negative to positive. If it is determined that the NTP short format timestamp value for the MMTP packet is discontinuous, the continuity determiner 25 deletes the matching information and the identification information from the management information corresponding to the MMTP packet and the subsequent MMTP packets. The continuity determiner 25 adds, to management information corresponding to the MMTP packet in which the discontinuity in the value of the NTP short format timestamp is found, a first indicator indicating that a discontinuity in the value of the NTP short format timestamp due to leap second insertion is found.

If the management information includes matching information and identification information indicating deletion of a leap second, the continuity determiner 25 detects a change in a value of the calculated difference. For the case where the value of the calculated difference changes from a value less than one second to a value greater than one second, and to a value less than one second, the continuity determiner 25 determines that the NTP short format timestamp value for the MMTP packet is discontinuous at the time when the value of the difference changes from a value greater than one second to a value less than one second. If it is determined that the NTP short format timestamp value for the MMTP packet is discontinuous, the continuity determiner 25 deletes the matching information and the identification information from the management information corresponding to the MMTP packet and the subsequent MMTP packets. The continuity determiner 25 adds to management information corresponding to the MMTP packet in which the discontinuity in the value of the NTP short format timestamp is found a second indicator indicating that a discontinuity in the value of the NTP short format timestamp due to leap second deletion is found.

The receive buffer input unit 26 stores the received MMTP packets in the ring buffer. The ring buffer may be a First In First Out (FIFO) buffer. The receive buffer input unit 26 adjusts the order of storing MMTP packets in the ring buffer as described below. That is, the receive buffer input unit 26 calculates the difference between an NTP short format timestamp added to an MMTP packet and time information acquired by the time acquisition unit 282 of the controller 28. The receive buffer input unit 26 reads matching information and identification information included in management information. The receive buffer input unit 26 stores in the buffer the MMTP packet having the first indicator in the corresponding management information to be placed subsequent to the MMTP packet in which the sign of the calculated difference is negative, and the corresponding management information includes the matching information and the identification information indicating the insertion of a leap second. The receive buffer input unit 26 stores in the buffer the MMTP packet having the second indicator in the corresponding management information that is placed subsequent to the MMTP packet in which the value of the calculated difference is greater than one second, and the corresponding management information includes the matching information and the identification information indicating the deletion of a leap second. The receive buffer input unit 26 outputs the stored MMTP packets to the receiving unit 27 at a predetermined timing, or in accordance with a predetermined control.

Figure 9:
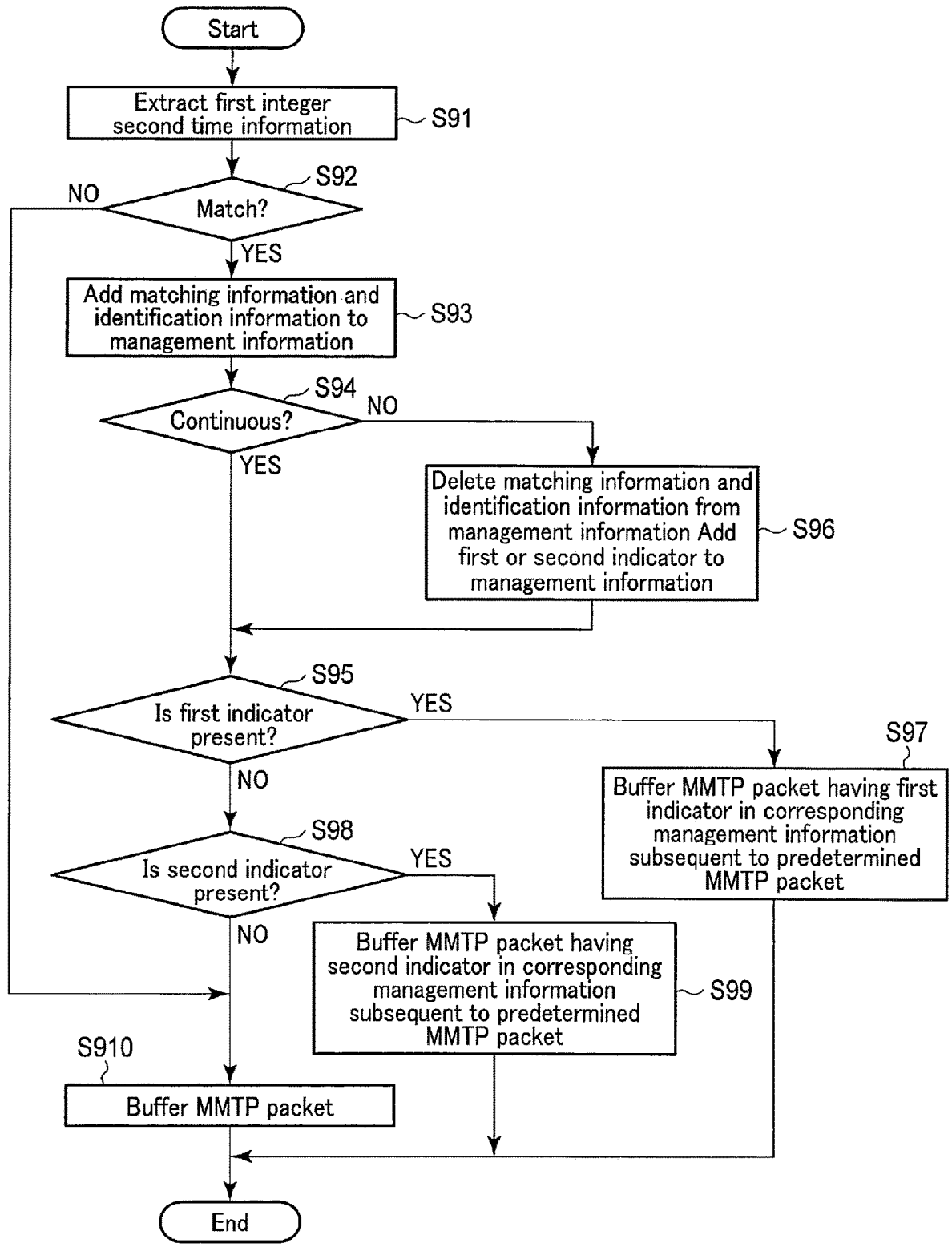
FIG. 9 is a flowchart of the operation when the receiver shown in FIG. 8 buffers an MMTP packet in consideration of leap second correction.

Next, the operation when the receiver 20 having the aforementioned configuration buffers an MMTP packet, taking leap second correction into consideration, will be explained. FIG. 9 is a flowchart of the operation when the receiver 20 buffers an MMTP packet, taking leap second correction into consideration. It is assumed that the discontinuity occurrence time acquisition unit 281 of the controller 28 outputs to the determiner 23 in advance identification information relating to leap second processing (insertion or deletion) and lower 16-bit integer second time information (second integer second time information) corresponding to the discontinuity occurrence time.

The extractor 22 extracts 16-bit integer second time information from an NTP short format timestamp added to an MMTP packet received at the receiver 20 (step S91).

The determiner 23 determines whether the first integer second time information extracted by the extractor 22 matches the recorded second integer second time information (step S92). If the first integer second time information matches the second integer second time information (Yes in step S92), the determiner 23 reports to the management information generator 24 matching information indicating the match and identification information relating to leap second processing. The management information generator 24 adds the matching information and identification information output from the determiner 23 to management information corresponding to the MMTP packet (step S93).

The continuity determiner 25 determines continuity of MMTP packets by referring to the management information (step S94). If MMTP packets are continuous (Yes in step S94), the receive buffer input unit 26 determines whether or not the first indicator is added to management information corresponding to the MMTP packet (step S95). If the value of the NTP short format timestamp added to the MMTP packet is discontinuous (No in step S94), the matching information and the identification information are deleted from the management information corresponding to the MMTP packet, and the first or second indicator is added to the management information (step S96).

In step S95, if the first indicator is added to the management information corresponding to the MMTP packet (Yes in step S95), the receive buffer input unit 26 stores in the buffer the MMTP packet having the first indicator in the corresponding management information to be placed subsequent to the MMTP packet in which the sign of the calculated difference is negative, and the corresponding management information includes the matching information and the identification information indicating the insertion of a leap second (step S97).

If the first indicator is not added to the management information corresponding to the MMTP packet (No in step S95), the receive buffer input unit 26 determines whether or not the second indicator is added to the management information corresponding to the MMTP packet (step S98). If the second indicator is added to the management information corresponding to the MMTP packet (Yes in step S98), the receive buffer input unit 26 stores in the buffer the MMTP packet having the second indicator in the corresponding management information to be placed subsequent to the MMTP packet in which the value of the calculated difference is more than one second, and the management information includes the matching information and the identification information indicating the deletion of a leap second (step S99).

In step S98, if the second indicator is not added to the management information corresponding to the MMTP packet (No in step S98), the receive buffer input unit 26 stores the MMTP packet in the buffer (step S910).

As stated above, in the receiver 20 according to the present embodiment, the determiner 23 determines whether or not the first integer second time information output from the extractor 22 matches the second integer second time information output from the discontinuity occurrence time acquisition unit 281. If the first integer second time information matches the second integer second time information, the management information generator 24 adds matching information indicating the match and identification information indicating the leap second processing to the management information. The continuity determiner 25 specifies MMTP packets prior to or subsequent to the MMTP packet in which a discontinuity in time is found, based on the matching information and the identification information included in the management information, and the difference between the value of the NTP short format timestamp added to the MMTP packet, and time information acquired by the time acquisition unit 282 of the controller 28. The receive buffer input unit 26 stores an MMTP packet immediately subsequent to the MMTP packet in which a discontinuity in time is found at a position subsequent to an MMTP packet prior immediately to the packet in which a discontinuity in time is found. By this processing, the order of MMTP packets is correctly maintained.

Thus, according to the receiver 20 of the present embodiment, MMTP packets can be received in the correct order even if a leap second is inserted or deleted.

In the present embodiment, the case where the discontinuity occurrence time acquisition unit 281 outputs to the determiner 23 identification information relating to leap second processing (insertion or deletion), and outputs lower 16-bit integer second time information corresponding to the discontinuity occurrence time upon acquisition of the discontinuity occurrence time, is explained. However, the embodiment is not limited thereto. The discontinuity occurrence time acquisition unit 281 may output to the determiner 23 lower 16-bit integer second time information among 32-bit integer second time information output from the NTP time counter 21 in a case where the leap second information does not indicate leap second processing. In this case, the discontinuity occurrence time acquisition unit 281 outputs to the determiner 23 the identification information indicating that there is no leap second processing to be performed.

Figure 10:
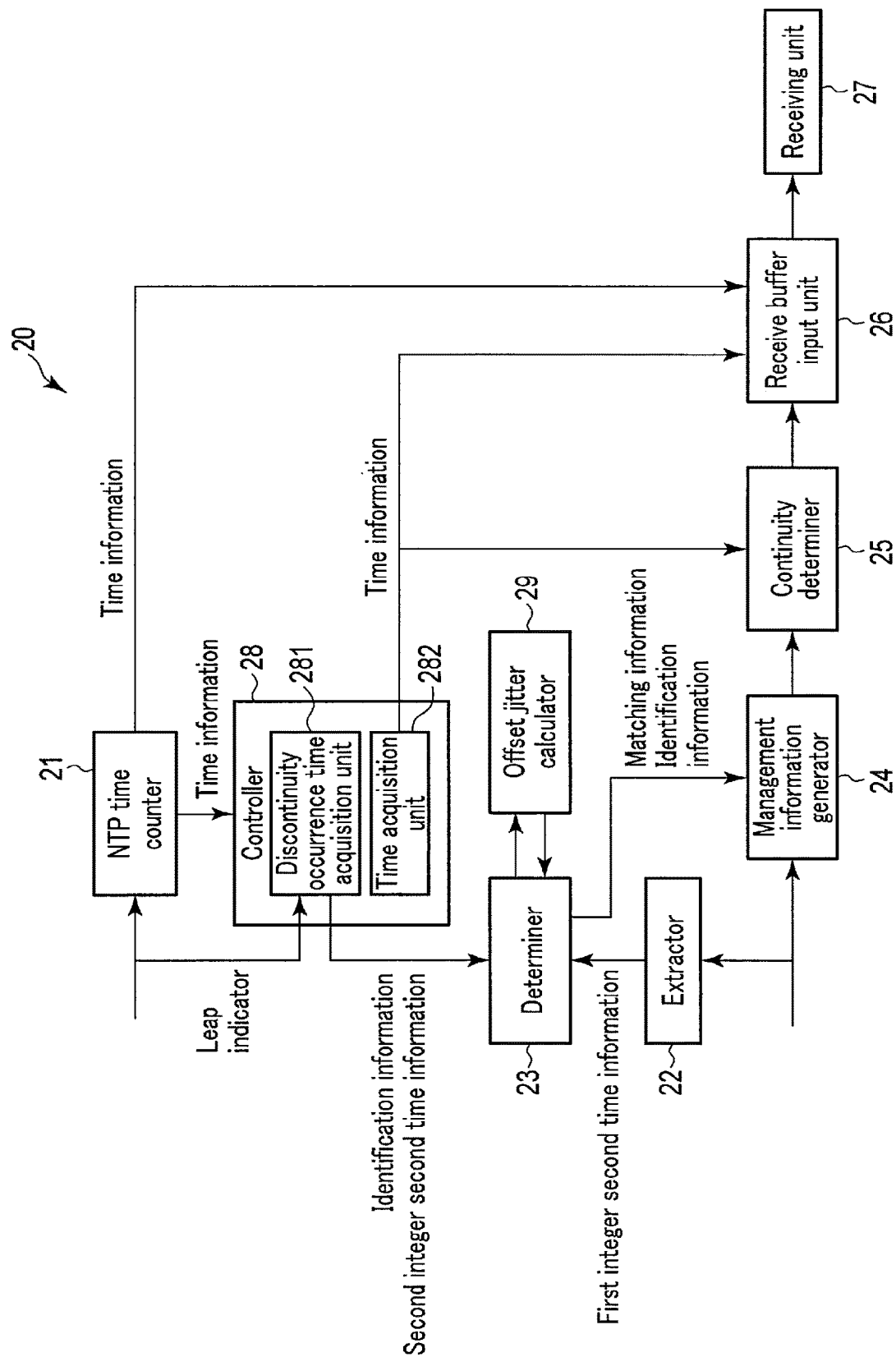
FIG. 10 is a block diagram showing another example of a functional configuration of the receiver shown in FIG. 1.

The receiver 20 according to the present embodiment may include an offset jitter calculator 29, as shown in FIG. 10. In this case, the discontinuity occurrence time acquisition unit 281 outputs lower 16-bit integer second time information to the determiner 23. The offset jitter calculator 29 receives the first integer second time information output from the extractor 22 and lower 16-bit integer second time information output from the discontinuity occurrence time acquisition unit 281 through the determiner 23. The offset jitter calculator 29 monitors the difference between the first integer second time information and the lower 16-bit integer second time information, and stores the maximum value of transmission path delay in advance. The offset jitter calculator 29 outputs the maximum value of transmission path delay to the determiner 23 as an offset value. The determiner 23 subtracts the offset value from the second integer second time information output from the discontinuity occurrence time acquisition unit 281, and compares the time after the subtraction with the first integer second time information.

The receiver 20 according to the present embodiment may include an extraction/packet alignment unit 210 instead of the extractor 22, as shown in FIG. 11. The extraction/packet alignment unit 210 uses a value of at least one of packet_counter and packet_sequence_number as auxiliary information to align the order of received MMTP packets. By this processing, the order of MMTP packets can be correctly maintained even if a network jitter is large at the receiver side.

While certain embodiments have been described, these embodiments have been presented by way of example only, and are not intended to limit the scope of the embodiments. Indeed, the embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the invention.

The invention claimed is:

1. A transmitting system comprising:
an outputting apparatus configured to transmit MPEG Media Transport Protocol (MMTP) packets to which a Network Time Protocol (NTP) short format timestamp is added, and a multiplexing apparatus configured to multiplex the MMTP packets, wherein
the multiplexing apparatus comprises circuitry configured to:
extract first integer second time information from the NTP short format timestamp added to an MMTP packet transmitted from the outputting apparatus;
acquire information relating to a leap second processing and second integer second time information corresponding to a discontinuity occurrence time that occurred due to leap second correction, based on information concerning a leap second included in an NTP packet and time information acquired based on an NTP;
determine whether the first integer second time information matches the second integer second time information;
generate, in response to a determination that the first integer second time information matches the second integer second time information, matching information indicating the match and identification information relating to the leap second processing;
determine whether the MMTP packet is closest to an MMTP packet in which an NTP short format timestamp value is discontinuous, based on the matching information, the identification information, and a difference between a value of the NTP short format timestamp and the time information acquired based on the NTP; and
adjust a transmission timing of a MMTP packet transmitted from the outputting apparatus, wherein the circuitry writes, for adjustment of a transmission timing of the MMTP packet being closest to the MMTP packet in which the NTP short format timestamp value is discontinuous, time information taking the leap second processing into consideration, to the NTP short format timestamp of the MMTP packet.

2. The transmitting system according to claim 1, wherein the circuitry is further configured to receive a plurality of MMTP packets, select MMTP packets in order of NTP short format timestamp value, and sequentially output the selected MMTP packet.

3. The transmitting system according to claim 1, wherein the circuitry outputs the MMTP packet having the NTP short format timestamp in which the time information is written, in accordance with the time information.

4. The transmitting system according to claim 1, wherein when the leap second processing is insertion of a leap second, the circuitry determines whether a time when the MMTP packet closest to the MMTP packet in which the NTP short format timestamp value is discontinuous is transmitted exceeds 00:00:00, and writes, when the time exceeds 00:00:00, time information indicating a value obtained by subtracting one second from an excess time.

5. The transmitting system according to claim 1, wherein when the leap second processing is deletion of a leap second, the circuitry determines whether a time when the MMTP packet closest to the MMTP packet in which the NTP short format timestamp value is discontinuous is transmitted exceeds 23:59:59, and writes, when the time exceeds 23:59:59, time information indicating a value obtained by adding one second to an excess time.

6. A multiplexing apparatus comprising:
circuitry configured to:
extract first integer second time information from a Network Time Protocol (NTP) short format timestamp added to an MPEG Media Transport Protocol (MMTP) packet;
acquire information relating to a leap second processing and second integer second time information corresponding to a discontinuity occurrence time that occurred due to leap second correction, based on information concerning a leap second included in an NTP packet and time information acquired based on an NTP;
determine whether the first integer second time information matches the second integer second time information;
generate, in response to a determination that the first integer second time information matches the second integer second time information, matching information indicating the match and identification information relating to the leap second processing;
determine whether the MMTP packet is closest to an MMTP packet in which an NTP short format timestamp value is discontinuous, based on the matching information, the identification information, and a difference between a value of the NTP short format timestamp and the time information acquired based on the NTP; and
adjust a transmission timing of a MMTP packet, wherein the circuitry writes, for adjustment of a transmission timing of the MMTP packet being closest to the MMTP packet in which the NTP short format timestamp value is discontinuous, time information taking the leap second processing into consideration, to the NTP short format timestamp of the MMTP packet.

7. The multiplexing apparatus according to claim 6, wherein the circuitry is further configured to receive a plurality of MMTP packets, select MMTP packets in order of NTP short format timestamp value, and sequentially output the selected MMTP packet.

8. The multiplexing apparatus according to claim 6, wherein the circuitry outputs the MMTP packet having the NTP short format timestamp in which the time information is written, in accordance with the time information.

9. The multiplexing apparatus according to claim 6, wherein when the leap second processing is insertion of a leap second, the circuitry determines whether a time when the MMTP packet closest to the MMTP packet in which the NTP short format timestamp value is discontinuous is transmitted exceeds 00:00:00, and writes, when the time exceeds 00:00:00, time information indicating a value obtained by subtracting one second from an excess time.

10. The multiplexing apparatus according to claim 6, wherein when the leap second processing is deletion of a leap second, the circuitry determines whether a time when the MMTP packet closest to the MMTP packet in which the NTP short format timestamp value is discontinuous is transmitted exceeds 23:59:59, and writes, when the time exceeds 23:59:59, time information indicating a value obtained by adding one second to an excess time.

11. A leap second correction method, comprising:
extracting first integer second time information from a Network Time Protocol (NTP) short format timestamp added to an MPEG Media Transport Protocol (MMTP) packet;
acquiring information relating to a leap second processing and second integer second time information corresponding to a discontinuity occurrence time occurred due to leap second correction, based on information concerning a leap second included in an NTP packet and time information acquired based on an NTP;
determining whether the first integer second time information matches the second integer second time information;
generating, in response to a determination that the first integer second time information matches the second integer second time information, matching information indicating the match and identification information relating to the leap second processing;
determining whether the MMTP packet is closest to an MMTP packet in which an NTP short format timestamp value is discontinuous, based on the matching information, the identification information, and a difference between a value of the NTP short format timestamp and the time information acquired based on the NTP; and
writing, for adjustment of a transmission timing of the MMTP packet being closest to the MMTP packet in which the NTP short format timestamp value is discontinuous, time information taking the leap second processing into consideration, to the NTP short format timestamp of the MMTP packet.

12. The method according to claim 11, comprising:
receiving a plurality of MMTP packets;
selecting MMTP packets in order of NTP short format timestamp value among the plurality of MMTP packets; and
extracting the first integer second time information from the NTP short format timestamp values added to the selected MMTP packets.

13. The method according to claim 11, comprising:
outputting the MMTP packet having the NTP short format timestamp in which the time information is written, in accordance with the time information.

14. The method according to claim 11, comprising:
when the leap second processing is insertion of a leap second, determining whether a time when the MMTP packet closest to the MMTP packet in which the NTP short format timestamp value is discontinuous is transmitted exceeds 00:00:00, and writing, when the time exceeds 00:00:00, time information indicating a value obtained by subtracting one second from an excess time.

15. The method according to claim 11, comprising:
when the leap second processing is deletion of a leap second, determining whether a time when an MMTP packet closest to the MMTP packet in which the NTP short format timestamp value is discontinuous is transmitted exceeds 23:59:59, and writing, when the time exceeds 23:59:59, time information indicating a value obtained by adding one second to an excess time.

\* \* \* \* \*

UNITED STATES PATENT AND TRADEMARK OFFICE
CERTIFICATE OF CORRECTION

PATENT NO. : 10,721,008 B2
APPLICATION NO. : 15/700397
DATED : July 21, 2020
INVENTOR(S) : Tomoo Yamakage et al.

Page 1 of 1

It is certified that error appears in the above-identified patent and that said Letters Patent is hereby corrected as shown below:

On the Title Page

Item (60), the Related U.S. Application Data information is incorrect. Item (60) should read:
--Related U.S. Application Data
(60) Continuation Application No. PCT/JP2015/083887,
Filed on Dec. 2, 2015--

Signed and Sealed this
Twenty-fifth Day of August, 2020

Andrei Iancu
*Director of the United States Patent and Trademark Office*